(12) United States Patent
Mehta et al.

(10) Patent No.: US 11,487,308 B2
(45) Date of Patent: Nov. 1, 2022

(54) ENSURING IOT DEVICE FUNCTIONALITY IN THE PRESENCE OF MULTIPLE TEMPERATURE DEPENDENCIES

(71) Applicant: International Business Machines Corporation, Armonk, NY (US)

(72) Inventors: Haard Kamlesh Mehta, Poughkeepsie, NY (US); David Wolpert, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 16/573,347

(22) Filed: Sep. 17, 2019

(65) Prior Publication Data
US 2021/0080982 A1    Mar. 18, 2021

(51) Int. Cl.
*G05D 23/19* (2006.01)
*G05F 1/46* (2006.01)
(Continued)

(52) U.S. Cl.
CPC ......... *G05D 23/1917* (2013.01); *G05F 1/462* (2013.01); *G06F 1/324* (2013.01);
(Continued)

(58) Field of Classification Search
CPC ......... G06N 20/00; G06F 1/462; G06F 1/324; G06F 1/3296; G06F 11/3062; G05D 23/1917
See application file for complete search history.

(56) References Cited

U.S. PATENT DOCUMENTS

| 92,920,277 | 3/2009 | Bernstein et al. |
| 9,292,027 B2 | 3/2016 | Ko et al. |

(Continued)

FOREIGN PATENT DOCUMENTS

| CN | 103389996 A | 11/2013 |
| WO | WO2015157370 A1 | 10/2015 |

OTHER PUBLICATIONS

Park et al., "Reversal of temperature dependence of integrated circuits operating at very low voltages", Proceedings of International Electron Devices Meeting, Dec. 10-13, 1995, pp. 3.5.1-3.5.4.

*Primary Examiner* — Phil K Nguyen
*Assistant Examiner* — Gayathri Sampath
(74) *Attorney, Agent, or Firm* — Scully, Scott, Murphy & Presser, PC; Jeffrey Ingalls, Esq.

(57) ABSTRACT

A system, method and computer program product for operating a low-voltage Internet-of-Things sensor device. The method includes sensing of the temperature dependence at each voltage condition in addition to the actual temperature and voltage. A programmed machine learning model uses the information to decide when it is appropriate to test the device functionality and use the results of different tests to determine when the system should run synchronously or asynchronously through a machine learning predictive algorithm. Based on said one or more sensed operating conditions, the system uses the model to detect a mode of operation of said IoT device indicating IoT device meets an expected level of performance, or a mode indicating said IoT device is not operating according to the expected level of performance. Based on the detected operating condition, the IoT device automatically adapts its operation to ensure a desired level of IoT sensor device performance.

19 Claims, 6 Drawing Sheets

(51) Int. Cl.
*G06F 1/324* (2019.01)
*G06F 1/3296* (2019.01)
*G06F 11/30* (2006.01)
*G06N 20/00* (2019.01)
*G06F 1/20* (2006.01)
*G06F 11/34* (2006.01)

(52) U.S. Cl.
CPC ........ *G06F 1/3296* (2013.01); *G06F 11/3062* (2013.01); *G06N 20/00* (2019.01)

(56) References Cited

U.S. PATENT DOCUMENTS

| | | | |
|---|---|---|---|
| 10,715,148 B1* | 7/2020 | Herberholz | H03K 19/1733 |
| 2003/0217337 A1* | 11/2003 | Prewett | G05B 17/02 |
| | | | 703/2 |
| 2018/0032064 A1* | 2/2018 | Fang | G05B 19/0425 |
| 2018/0121931 A1* | 5/2018 | Bender | G16Y 40/50 |
| 2018/0123604 A1 | 5/2018 | Raja et al. | |
| 2018/0164864 A1 | 6/2018 | Peffers et al. | |
| 2019/0155659 A1* | 5/2019 | Rodriguez Bravo | H04L 67/16 |

\* cited by examiner

ENSURING IOT DEVICE FUNCTIONALITY IN THE PRESENCE OF MULTIPLE TEMPERATURE DEPENDENCIES

FIELD

Embodiments of the present invention generally relate to Internet of Things (IoT) device deployment and functionality including IoT device sensors that are subject to multiple temperature dependencies.

BACKGROUND

As known, there exists phenomena of integrated circuit (IC) known as reversal of temperature dependence in which ICs, while operating at nominal voltages, reduce in performance as temperature increases; however, at low voltages, there is a cross-over point where the performance of the device increases with the increase in the temperature.

FIG. 6 illustrates the concept referred to as reversal of temperature dependence in the plot 50 depicting a non-limiting example of a circuit's frequency performance (y-axis) at particular operating temperature conditions (x-axis) and applied direct current (DC) supply voltage conditions. In the plot 50, a maximum frequency in Hz is used as a measure to evaluate the circuit performance. As the temperature increases, performance degradation occurs and the rate of decrease gradually decreases with supply voltage. That is, as shown in FIG. 6, a speed of performance (e.g., maximum operating frequency) of an example circuit or chip, e.g., memory circuit, becomes smaller at nominal (higher) supply voltages and increasing temperatures. However, with decreasing applied supply voltage shown in the key of voltages 55, a cross-over point exists as voltages are reduced where the temperature dependence is reversed, e.g., shown by the plot 60 corresponding to a $V_{DD}$ supply of 1.6V. That is, the applied operating voltage of 1.6 V represents the cross-over point at which temperature dependence is reversed and device performance enhances with increasing temperature.

As low-voltage IoT sensor devices operating under higher temperatures observe a change from performance degradation to performance enhancements at a certain cross-over voltage, there is needed a mechanism to know at what temperature dependence the IoT device is currently operating, to ensure that on-board temperature sensors are correctly predicting/estimating system performance.

SUMMARY

A system, method and computer program product is provided that performs IoT device monitoring to ensure optimal IoT device functioning.

In one aspect, the system and methods employed provide a solution implementing a machine learning algorithm applied to make decisions on whether the system is functioning correctly or is expected to function correctly, particularly, by using machine learning to determine when a device has and has not operated correctly in the past based on sensed operating conditions, to determine when it is acceptable to operate in the future.

In one aspect, the system and methods implementing a machine learning algorithm employs a look-up table (e.g. temperature charts) created in advance by observing a device temperature at each voltage condition. In this manner, a range of voltages is determined for the specific IoT device under which the specific device can operate. Advantageously, this will lead to less power consumption while ensuring that the device will operate without failing to meet its timing requirements.

According to one aspect of the present invention, there is provided a method of operating an Internet-of-Things (IoT) sensor device. The method comprises: receiving, at a hardware processor associated with an IoT device sensor, one or more sensed operating conditions obtained from a monitoring circuit associated with the IoT device; determining, by the hardware processor, based on the one or more sensed operating conditions, a mode of operation of the IoT device, the mode of operation selected from: a mode indicating IoT device meeting an expected level of performance, or a mode indicating the IoT device is not operating according to the expected level of performance; and automatically adapting an operation of the IoT sensor device according to the determined mode to ensure a desired level of IoT sensor device performance.

In another aspect of the present invention, there is provided a system for monitoring an Internet-of-Things (IoT) sensor device. The system comprises: a hardware processor communicatively coupled to a memory storage device for storing instructions used to configure the processor device to: receive, from one or more sensors of a monitoring circuit associated with an IoT device sensor, one or more sensed operating conditions at the associated IoT device sensor, the sensed operating conditions comprising one or more of: a voltage condition sensed by a voltage sensor of the monitoring circuit and a temperature condition sensed by a temperature sensor of the monitoring circuit; determine, based on the one or more sensed operating conditions, a mode of operation of the IoT device, the mode of operation selected from: a mode indicating IoT device meeting an expected level of performance, or a mode indicating the IoT device is not operating according to the expected level of performance; and automatically adapt an operation of the IoT device according to the determined mode to ensure a desired level of IoT sensor device performance.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
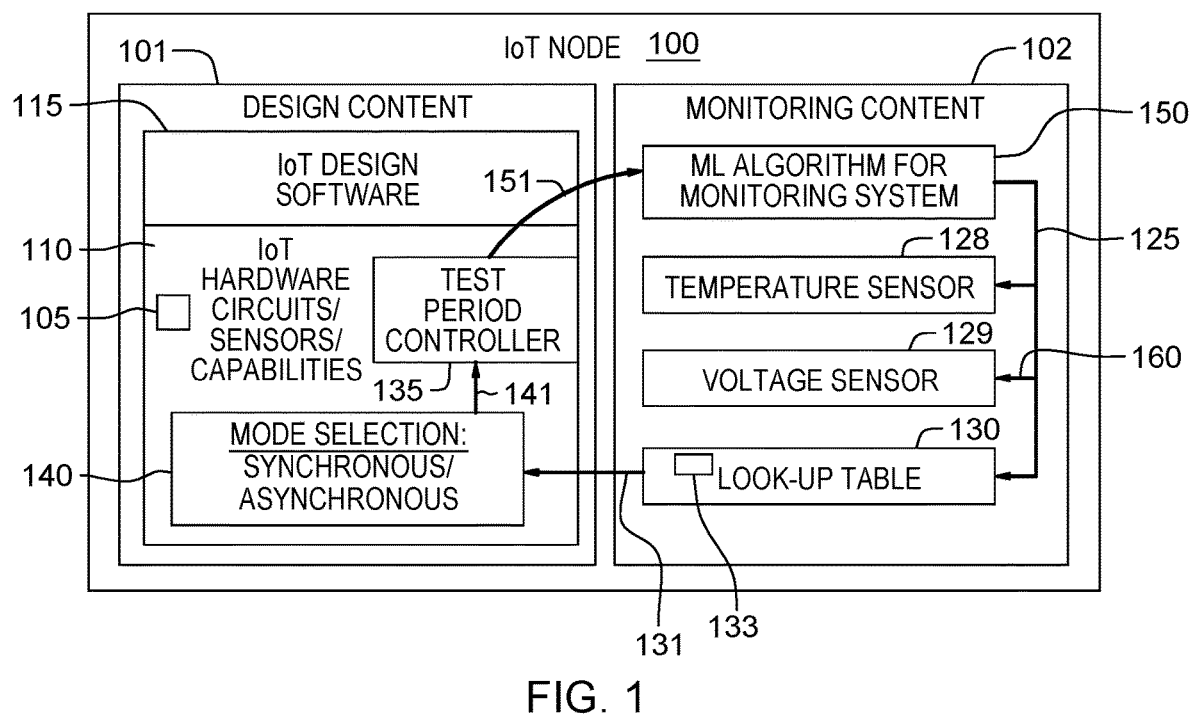
FIG. 1 depicts an example circuit diagram of an IoT sensor device according to one embodiment.

As shown in FIG. 1 there is depicted a sensor device such as an Internet-of-Things (IoT) sensor device or node 100 employed in the embodiments herein. The IoT sensor node 100 can be a low-voltage IoT device that, when operating under higher temperatures, observes a change from performance degradation to performance enhancement at a certain cross-over voltage. Knowledge of this phenomena for specific IoT devices can be exploited to more accurately predict IoT device performance given a current set of operating conditions under which the IoT device operates.

In an embodiment, as shown in FIG. 1, IoT design content 101 refers to the IoT 'device capability' circuitry while the monitoring content 102 refers to the IoT device circuitry employed to determine 'is the device in the correct operational conditions for it to be able to work?'.

In an embodiment, design content 101 of IoT node 100 includes a smart IoT sensor 105 and associated processing hardware circuitry 110 running under control of IoT design software 115 to carry out the functions of the sensor in a synchronous manner, e.g., continuously or periodically. For example, the IoT circuit hardware 110 may include a clock circuit for generating a clock signal used for sensor sampling operations that is responsive to an oscillator crystal operating under control of an applied (temperature dependent) voltage signal. In an embodiment, the IoT sensor 105 is a wired or wireless environmental IoT sensor configured for use in a variety of applications requiring measurement, e.g., measuring environmental conditions in an area or region, measuring water flow in pipes and pipe branches of a public water distribution network, and/or measuring other system parameters.

For example, the design content 101 is part of the node 100 includes sensor 105 that measures water flow, while the monitoring content 102 examines the temperature condition/voltage condition, etc. to make sure that the flow meter is working correctly and is expected to work in those conditions. The monitoring content 102 ensures that the design content 101 is working correctly by controlling the operation mode of the design content. According to an embodiment, the monitoring circuitry 102 is provided with capability of monitoring IoT device usage and implement machine learning algorithms to maximize IoT device usage/functionality as intended in an IoT sensor system. Use of a machine learning model infrastructure, per IoT sensor device, enables the system to learn and understand device behavior under the conditions in a repeatable manner.

As an example, an IoT device behavior can be characterized by a series of parameters, two parameters of which including temperature and voltage conditions are known, and other parameters specific to the device, e.g., the device physics resulting from different manufacturing process variations. Thus, for a given IoT device sensor chip, the parameters associated with IoT sensor device physics are random variables, and the machine learned model learns the IoT device performance behavior given a snapshot of current sensed IoT device conditions (e.g., voltage, temperature) and given the actual IoT sensor chip device performance at those conditions. Thus, the trained machine learning model is configured to determine an expectation of what the performance curves should be given all parameters that are known (e.g., sensed voltage and temperature conditions) and unknown at the outset. Thus, for a given set of known parameters (sensed conditions), the machine learning model can determine the IoT device's expected performance at those conditions. The machine learning model further determines under what conditions the device can work that they need to at the operating speed that they need to, and consequently the conditions that the device will not work at the operating speed that they need to. Thus, based on a current environment the IoT device is working in, the model can output a yes or no indication indicating that the IoT device is functioning as expected, e.g., can optimally perform, or is not functioning as expected.

The IoT node 100 shown in FIG. 1 further includes a monitoring circuitry including a temperature sensor 128 for continuous or periodic monitoring of the IoT sensor current device temperature, and additionally a voltage sensor 129 that monitors actual voltage signals generated for operating the IoT sensor, e.g., an actual voltage generated for driving a crystal oscillator to operate at a designed frequency and which can vary according to a sensed operating temperature.

In an embodiment, a system whether including a single IoT device or network of IoT devices, can be run optimally, given the expected known behavior of the IoT device(s). This avoids the need for having to constantly run a checking diagnostic to continuously monitor device behavior, and enables a configuration where a checking infrastructure can be invoked more infrequently, e.g., once every thousand cycles, in order to validate IoT device behavior.

As further shown in FIG. 1, IoT device runs a hardware processor circuit programmed with instructions for initiating a running or an updating of a Machine Learning predictive algorithm 150. In an embodiment, a snapshot of current IoT device operating conditions, e.g., voltage, temperature, are provided as inputs for driving the model algorithm for use in determining an expectation of device behavior, and deciding, based on the determined expectation of device behavior, when it is appropriate to test the IoT device functionality. In an embodiment, the results of different tests are used to determine when the IoT device system should run synchronously or asynchronously.

In an embodiment, IoT node 100 employs a look-up table 130 (LUT) to determine the expected functionality of the device in the presence of multiple temperature/frequency dependence slopes. In an embodiment, look-up table 130 includes entries corresponding to ranges of operating conditions and is aware of normal and reverse temperature dependence impact on system functionality. In an embodiment, associated with each LUT table entry is a counter mechanism 133 that increments/updates when IoT device operation at the sensed conditions is detected as good, e.g., for some duration of time, or operation when is detected good for some lesser duration of time at a worse set of conditions. The counter mechanism indicates whether there are enough data points obtained for the particular set of conditions to determine that it is acceptable to trust that the IoT device will continue working or not working based on the given table entry results.

The actual sensed device temperature at temperature sensor 128, the actual voltage used by the IoT device as sensed by voltage sensor 129, and look-up table 130 entry values are communicated via a conducting bus 160 to route these sensed signals and look-up table values to the processor circuit as input to the machine learning (ML) predictive algorithm.

The methods programmed to run at the IoT node 100 include operations for the sensing of the temperature dependence at each voltage condition in addition to the actual temperature and voltage such that the IoT node 100 will know at what temperature the IoT node is currently operating.

In one aspect, the sensor device and system IoT node 100 processor runs methods provided to sense the temperature dependence at each voltage condition, and use the information to decide when it is appropriate to test the IoT device functionality. In an embodiment, the IoT node 100 employs feedback that checks the results of different tests to determine when/whether the system should run synchronously or asynchronously through the Machine Learning predictive algorithm.

As shown in FIG. 1, a test period controller 135, embodied as a physical/electronic circuit switch, is provided to control how frequently the monitoring content needs to examine that design content. This aspect of IoT device monitoring is important because how frequently the monitoring is performed affects battery life and less frequent monitoring ensures longer life. For example, if the clock frequency of the design content is not sufficient for functionality in the monitored conditions, the system can switch from synchronous operation to an asynchronous mode to avoid potential performance issues. That is, controller 135 responds to the determination made by monitoring content 102 through the Machine Learning predictive algorithm whether the system is to continue using the system clock (synchronous operation) or just run in the asynchronous mode that is slower speed and less efficient.

As shown in FIG. 1, the test period controller 135 feeds the machine learning algorithm 150 and is fed by the results of the machine learning algorithm, so the machine learning algorithm has an indication of how often the current tests are needed and can use that information as an estimate of 'goodness', i.e., testing very infrequently means a high confidence of optimal system performance, while testing very frequently means the algorithm needs to be re-considering the look-up table values either because the environment is changing rapidly or the system is experiencing new combinations of conditions.

As further depicted in FIG. 1, the machine learning algorithm 150 for the monitoring content 102 is used to drive, via bus connection 160, the sensor polling of the temperature sensor 128 and voltage sensors 129 and the corresponding look-up table entry setting, which, at 131 is used to set the mode of operation, i.e., synchronous or asynchronous, at mode selection module 140. The mode selection module 140 generates signal 141 for receipt at test period controller 135 to effect an IoT device mode of operation switch. If, based on the algorithm results, the mode selection module 140 changes operating modes very frequently, then that input 141 feed affects how often test period controller 135 invokes tests, which is then fed back at 151 into the ML algorithm 150. In additional embodiments, there can be more detailed information passed back and forth between each of these sensors/modules and the ML algorithm.

Figure 2:
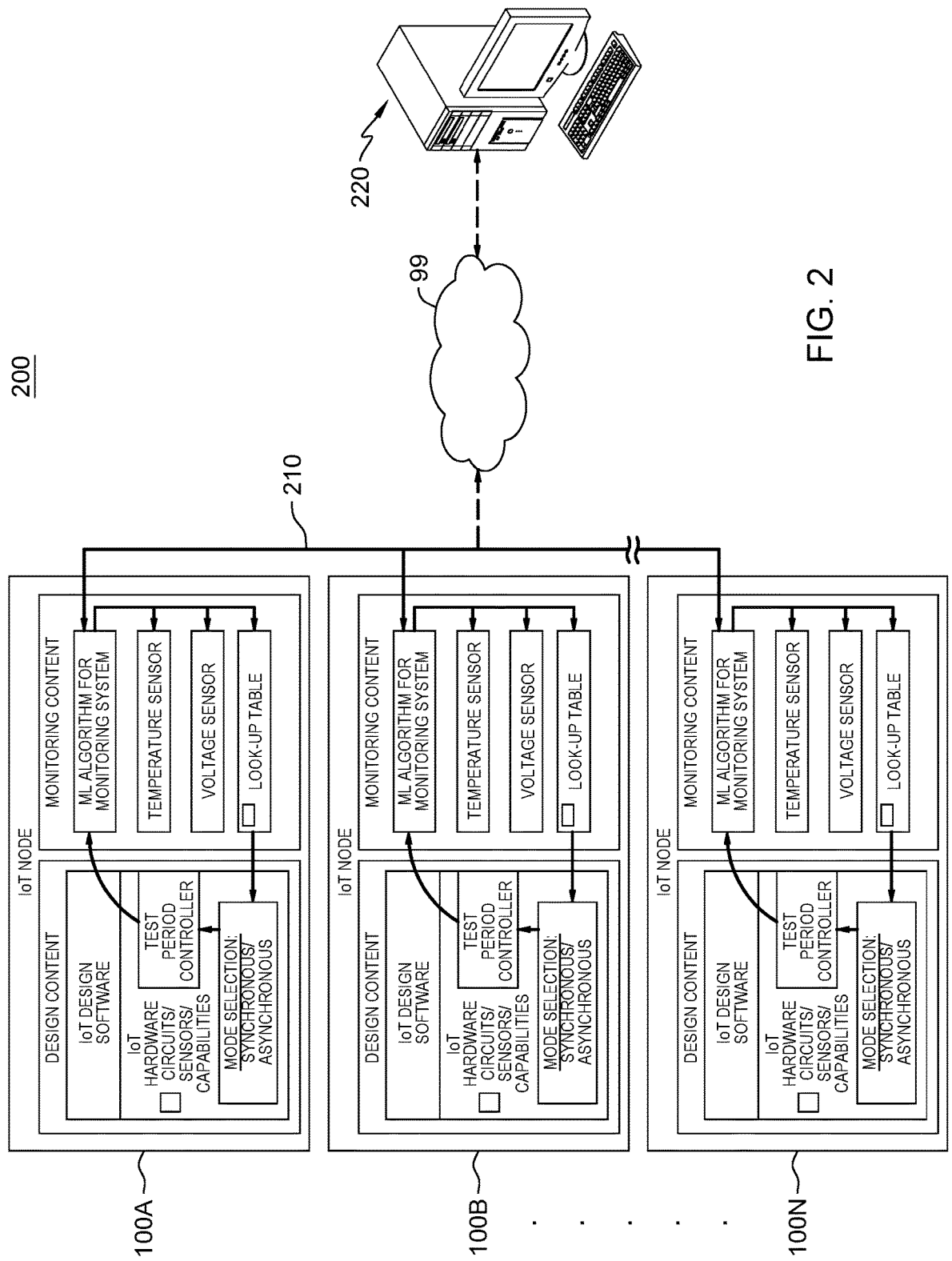
FIG. 2 depicts an example circuit diagram of a networked interconnection of a plurality of distributed IoT sensor devices according to one embodiment.

As shown in FIG. 2 there is depicted a network 200 of Internet-of-Things (IoT) sensor devices 100 depicted 100A, 100B, . . . , 100N interconnected via wired/wireless communications links, or via communications over a system data/address bus 210. These IoT devices may be networked together as an IoT system monitoring network for more comprehensive sensing of operations for operating/controlling a whole system infrastructure, e.g., learning and understanding a behavior of the system under certain operating conditions (e.g., voltage, temperature). Such IoT system applications can include but are not limited to: monitoring server machines of a data center, monitoring a distributed network of machines, monitoring water flow conditions in piping branches of a municipal watering system, monitoring a traffic control system, etc.

In an embodiment depicted in FIG. 2, the distributed IoT devices 100A, 100B, . . . , 100N can wirelessly communicate with each other over a communications network 99. Based on detected modes of operation at any IoT device 100A, 100B, . . . , 100N, a server or like computing device 220 can be used to provide centralized control decisions for the whole system. Otherwise, or in addition, the system works as a 'distributed intelligence' where the ML algorithms 150 are feeding off each other in addition to their local node.

The output of these devices can be recorded and centrally monitored by a remote server connecting the IoT system monitoring network. By employing the Machine Learning predictive algorithm, a system including IoT sensing devices better understands the system performance expectation as it takes into account the reverse and normal temperature dependence depending upon the device operating regime. Otherwise, in a regular temperature system, there are guard bands in place so the system may not run at an optimal point.

In an embodiment, the communication link(s) or bus 210 between the ML Algorithms of each IoT device 100A, . . . , 100N enables each of the different IoT nodes to talk and run routines to determine if one node is misbehaving, or to determine if an event is travelling across nodes. For example, if the IoT monitoring system 200 is employed for monitoring traffic congestion in a city and there is detected a huge influx of cars in one part of the city, this might affect traffic lights in nearby regions to control traffic flow.

For each IoT sensor device whether stand alone or in a networked system, there is generated a corresponding temperature chart or look-up table which indicates a range of voltages under which the device can operate. Use of the LUT leads to less power consumption and the device will operate without failing to meet its timing requirements. For example, the use of the LUT by the machine learning model can obviate the need to use a checking system employed to check and validate the IoT device (or network of devices) performance, or at least reduce the frequency of invoking the checking system employed to perform a device (or network of devices) performance validation check, i.e., reducing a guard band. That is, a guard band of the uncertainty where the system can determine whether the sensitivity is increasing or decreasing current is reduced and/or a guard band for power savings is reduced as a better prediction is enabled to be made so the validation checks are made less frequently.

In an embodiment, the look-up table is pre-programmed and used by the machine learning model for adaptively reacting operation of the IoT device based on existing environmental conditions to ensure desired device functionality.

Figure 3:
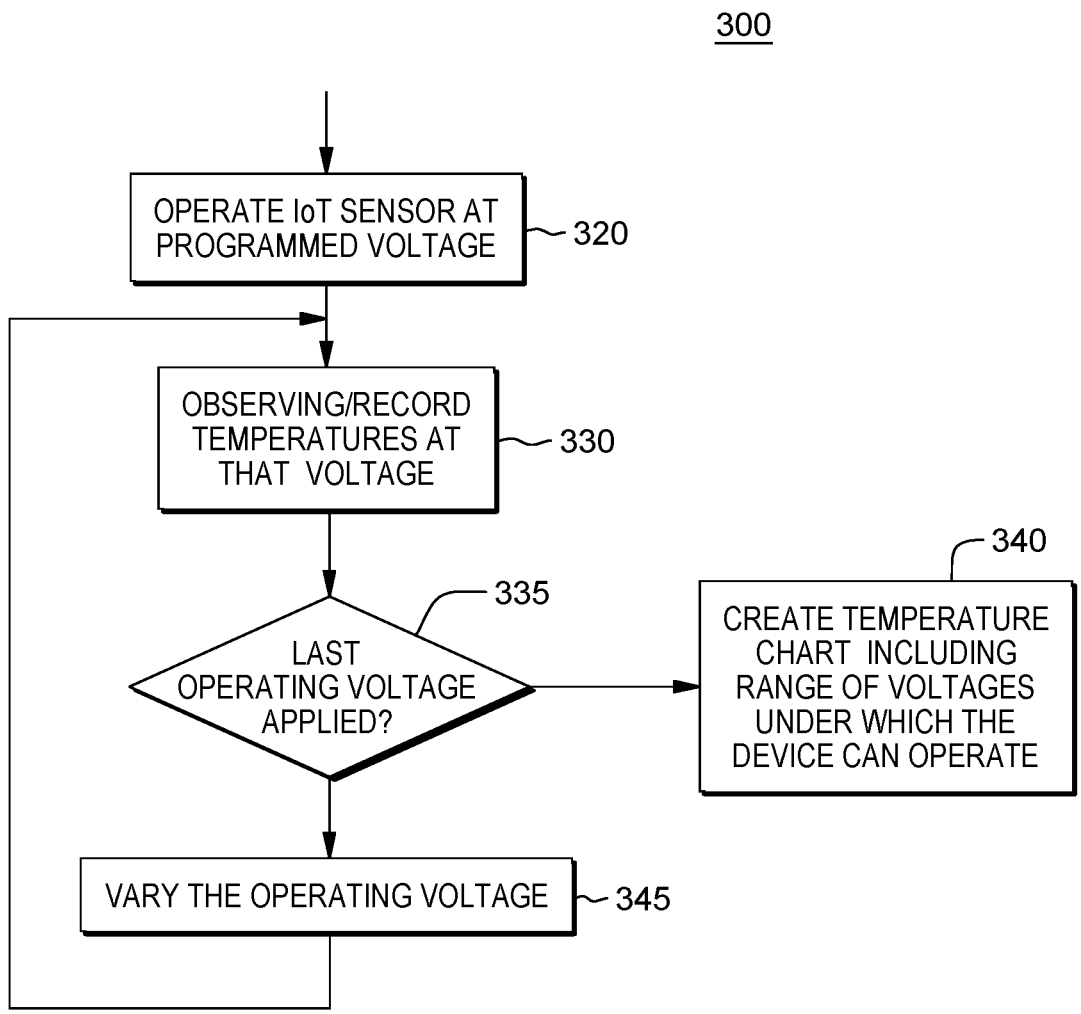
FIG. 3 depicts a method of creating temperature charts in the form of a look-up table for indicates a range of voltages under which a specific IoT device can operate optimally at an intended operating speed.

FIG. 3 depicts a method of creating temperature charts in the form of a look-up table which indicates a range of voltages under which the specific IoT device can operate to define for the system whether it is acceptable for the IoT device to run in synchronous mode (e.g., with clock) or asynchronous mode (e.g., without clock) of operation. In particular, the machine learning mechanism is used to populate the lookup table with operating conditions such that the IoT device is aware of normal and reverse temperature dependence impact on system functionality, i.e., whether the device can function normally or not under a given combination of device conditions and operating voltage.

As an example, the machine learning (ML) model employs a regression-based algorithm for populating a lookup table based on a given past history of IoT usage at various temperature and voltage conditions, and whether such past conditions resulted in acceptable IoT device performance or unacceptable IoT device performance which triggered a fail-over condition. Then, using such a populated look-up table ensures that the IoT device and/or system of IoT devices is/are configured to adaptively react to a given set of existing environmental conditions to ensure desired device functionality. The LUT is continually updated as new input data are collected corresponding to new sets of IoT device operating conditions and corresponding device performance results.

In a non-limiting embodiment, the machine learning model based on linear regression is trained to determine when a device has and has not operated correctly in the past to determine when it is acceptable to operate in the future.

As an example, the regression-based ML algorithm inputs or receives sets of voltage and temperature conditions to determine an effective likelihood of success based on the most recent X readings (or all past readings). The likelihood of success indicates correct operation or correct prediction of operation (whether prediction is for 'correct' or 'incorrect' readings). The inputs to the machine learning algorithm are the prediction from the LUT conditions table, the result from the sensor, and the result from the IoT system (i.e., is the sensor extremely off-base compared to other sensors in the region, or compared to recent readings from the sensor). As an example, given an IoT system of temperature sensors in a water system that functions to avoid pipes freezing in apartment buildings in a city, if suddenly one of the temperature sensors starts indicating the temperature is falling, while all of the other sensors in every other building in the city are rising, the system determines the mis-performing sensor, flags it, and compares both the 'normal' and 'reverse' temperature dependence readings to see if the problem was a bad table entry. The system will correct the table entry if necessary, and carry on operating. The use of the machine learning algorithm performs that validation/communication automatically, and 'learns' an optimal set of table entries to ensure the nodes in the system are working as desired without manual intervention.

In additional embodiments, when implemented as part of a network of interconnected IoT devices shown in FIG. 2, the LUT mechanism further keeps track of each of the networked sensor(s) past behavior at various operating conditions (e.g., voltage and temperature settings) that can be used to predict future performance.

In the creation of temperature charts in the form of a look-up table as shown in FIG. 3, at 320, the IoT device is programmed to operate at a first voltage of a range of voltage conditions under which that IoT device can still operate and meet its frequency timing requirements. At 330, the actual operating temperature is measured using the temperature sensor in the IoT device and the measured temperature at that voltage is recorded. Continuing to 335, a determination is made as to whether a final voltage in an operating range of voltages for that IoT device has been reached. If there are more voltages to operate the device at and to record its corresponding performance at a particular temperature condition, the process proceeds to 345 where the operating voltage applied is varied, e.g., reduced from its nominal voltage. The process then continues to 330 to record the temperature conditions under which it operates and record them. The process steps 330, 335, 345 are repeated until such time at 335 it is determined that a voltage that the device can operate has been applied and a corresponding temperature condition determined and recorded. At such time, at 340, a temperature chart is created including the range of voltages under which the device can operate for that specific IoT device.

In additional embodiments, besides generating a temperature chart including range of voltages under which a specific IoT device can operate, a chart can be generated for several IoT devices having similar attributes (e.g., all IoT devices monitoring water flow in a localized area) where behaviors can be averaged together to avoid having to poll all sensors of each of a plurality of devices. This also enables new nodes to be added to an existing system and take advantage of learning from other nodes already in the system and operating environment.

Figure 4:
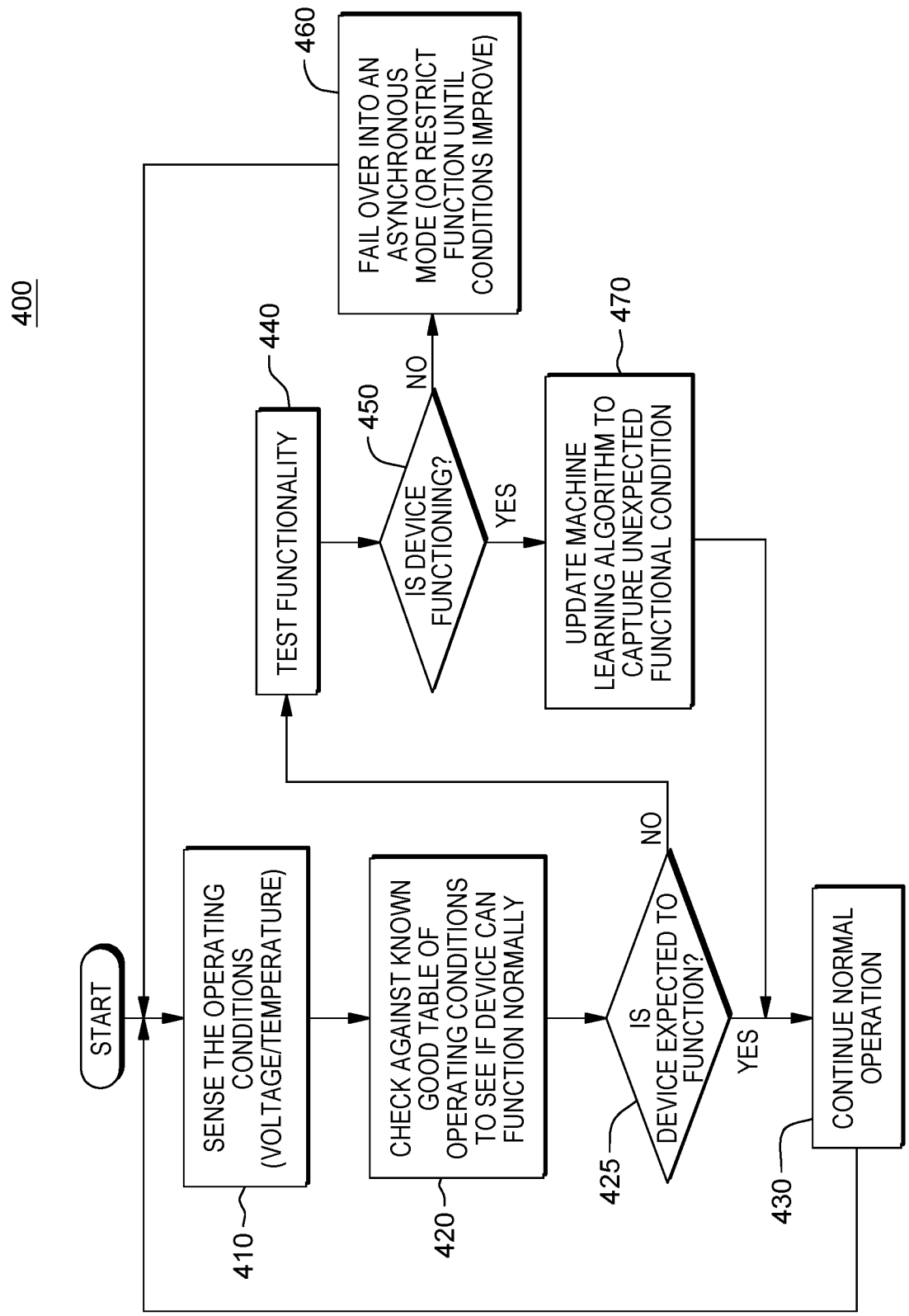
FIG. 4 depicts a method of operating the IoT device(s) of FIGS. 1 and 2 in an embodiment.

As shown in FIG. 4 there is depicted a method 400 of operating the IoT device of FIG. 1. As shown at a first step 410, an IoT operates in a stand-alone manner to communicate usable sensor data to an entity device, e.g., an interested party. The method described in FIG. 4 is further applicable to an IoT device that is part of a networked system including a variety of IoT sensors interconnected such as shown in FIG. 2, and which can communicate amongst themselves to automate tasks.

While operating, at 410, a sensing operation is performed to sense the operating conditions, in particular, invoking a measurement or reading of the voltage sensor to determine the applied voltage condition, and invoking a measurement or reading of the device's temperature condition.

Continuing at 420, as part of the machine learning processes, a check is made as to whether the current voltage/temperature operating conditions indicate normal device functionality. In an embodiment, step 420 includes checking the current measured voltage and temperature conditions against known good operating conditions found in the look-up table to see if the device can function normally, e.g., synchronously. In an embodiment, the machine learning model is trained to determine whether the IoT device is expected to function correctly based on inputs including the look-up table of measurements and the current sensed voltage/temperature for that IoT device.

In an alternative embodiment, or in addition, between the sensing of operating conditions at step 410 and the step 420 of checking these operating conditions against the known LUT of operating conditions to determine whether the device can function normally, a counter device 133 associated with the corresponding table entry of conditions is checked to determine that the data at that table entry in a known-good table has been sufficiently exercised to know if the data at that LUT entry is reliable or not.

In a further embodiment, in the case that the IoT device 100A is part of a network of devices, the method at step 400 can include additional functionality to ascertain whether the known-good conditions are applicable for sharing across multiple IoT devices of that network; thus, a further processing loop at this step can be employed to determine whether the devices are subject to a similar set of conditions, e.g., in a particular region's underground piping system. Thus, the LUT can be generated more quickly because each of the devices, while operating under similar conditions can divide up the task of exploring a given environment, and thus may be able to expedite understanding of when devices may operate correctly or not operate correctly in that environment. Thus, in the case of networked IoT devices, at step 420, FIG. 4, the good LUT table of operating conditions is populated across multiple networked IoT devices. The ML model creates the LUT, the LUT being a snapshot of the model for use in deciding whether the device is expected to function optimally or not given all previous performance histories of like devices. The LUT can be generated more efficiently with each of the devices while operating under a similar set of conditions around a same sensor point, resulting in providing an accurate indication of when the devices operate correctly or do not operate correctly. Thus, multiple sensors can be used to explore a range of operating levels in a given environment more quickly, or to provide more confidence in the operation at a specific given point, or some combination of the two.

Using the machine learning model, there is obtained results of comparing the current measured voltage and temperature condition against the values of the look-up table for that device, and a determination is made at 425 whether the device is expected to function correctly.

If at 425, it is determined that the device is expected to continue normal operations given the current voltage and temperature conditions, the process proceeds to 430 such that normal operations can be continued. In such a scenario, the process will return to 410, FIG. 4 in order to take a next measurement of the voltage and temperature conditions and the IoT device voltage and temperature condition monitoring steps 410-430 are continuously repeated.

In an embodiment, the machine learning model determines when it is acceptable to take a sample reading from an IoT sensor, or run a diagnostic program on the IoT device. Thus, returning to 425, if it is determined that the device is not expected to function based on the current voltage and temperature conditions, then the process continues to 440 to test the functionality of the IoT device. As an example, if the current sensed temperature/voltage conditions indicate that the device is not functioning as expected, a diagnostic procedure or test may be performed to test the integrity of the device to ensure it is operational or at least functioning. Then, at 450, a determination is made as to whether the IoT device is functioning correctly, incorrectly or not at all.

If, at 450, it is determined based on the diagnostic test that the IoT device is not functioning, then the process proceeds to 460 where the IoT system fails over into an asynchronous mode, or a mode in which IoT device functionality is restricted until voltage/temperature conditions improve.

Such a fail-over condition exists when the method is unable to predict what the required performance is, yet the system can still take IoT sensor samples without imposition of any artificial constraints (i.e., a fail-safe mode). Thus, either operating conditions are poor and the system is so slow requiring that the IoT device needs to be operated differently, or there is a detected uncertainty and the system cannot assume that the device is to operate in a way that it is expecting to. Thus, the IoT device can enter into asynchronous mode and not sample periodically (e.g., every second) but rather let the system sample in its own time frame (e.g. minutes) and inform the system when the IoT sensor sampling is done.

For example, while operating in a fail-over system or asynchronous mode, the clock operating the IoT device is turned off such that the IoT device can work asynchronously below a certain voltage. In an embodiment, the IoT device or system can transit to such a fail-safe mode of operation when the device fails because of temperature-induced variations. Then, the system will return to 410, FIG. 4 in order to repeat the monitoring steps 410-430.

Otherwise, if, at 450, it is determined based on the diagnostic test that the IoT device is functioning, notwithstanding the determination at 425 that the device is not expected to function, then, as part of the machine learning process, the process proceeds to 470 where the machine learned regression-based algorithm is updated to capture unexpected functional condition for that IoT device.

In an embodiment, the failover capability of the system can be enabled if a corresponding cost is acceptable. Otherwise, the failover capability can enter a safe mode until operating conditions return to a known-good state.

Upon updating the machine learning algorithm at 470, the method returns to operation and eventually returns to step 410, FIG. 4 in order to repeat the monitoring steps 410-430.

In a further embodiment, the system 100 can employ limitations with respect to testing capability to improve future system functionality decisions. For example, in an embodiment, a single good case is likely insufficient to say that all future cases in those conditions will be good. Thus, the machine learning algorithm is configured to make decisions on when the system is functioning under an unexpected condition before updating the table.

Thus, in an embodiment, the system is configured with a counter per look-up table entry that only updates the LUT when operation is detected as good for some duration of time "t" at a specific (e.g., voltage, temperature) condition, or operation is detected good for some lesser duration of time at a worse set of conditions. The counter mechanism (per LUT entry) will determine whether there are enough data points obtained for the particular set of conditions to determine that it is acceptable to turn off the initial sensing requirement, i.e., trust that the IoT device will continue working or not working based on the given table entry results.

In a further embodiment, at 460, after several iterations of the method 400 exiting to the fail-safe mode, a decision can be further implemented at 460 to determine whether a threshold number of iterations have been repeated to indicate an end-point condition. Should an end point condition be reached after a threshold number of iterations of the method 400 have been repeated, the system can alert the user or communicate a further need to run additional diagnostics or even IoT device replacement due to in ability to function as expected.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

Figure 5:
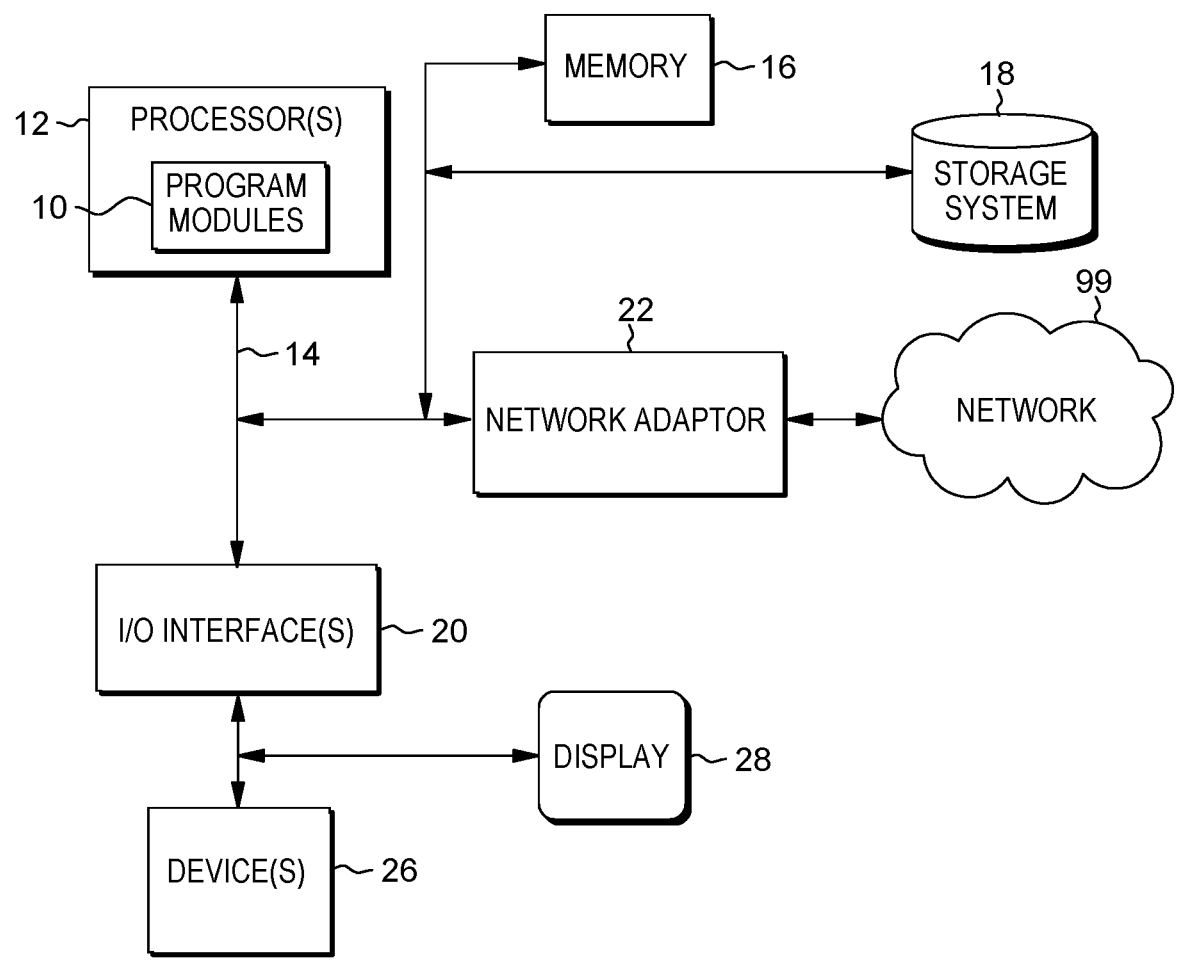
FIG. 5 illustrates an example block diagram of a computing system employing methods to ensure IoT device functionality in accordance with an embodiment.
Figure 6:
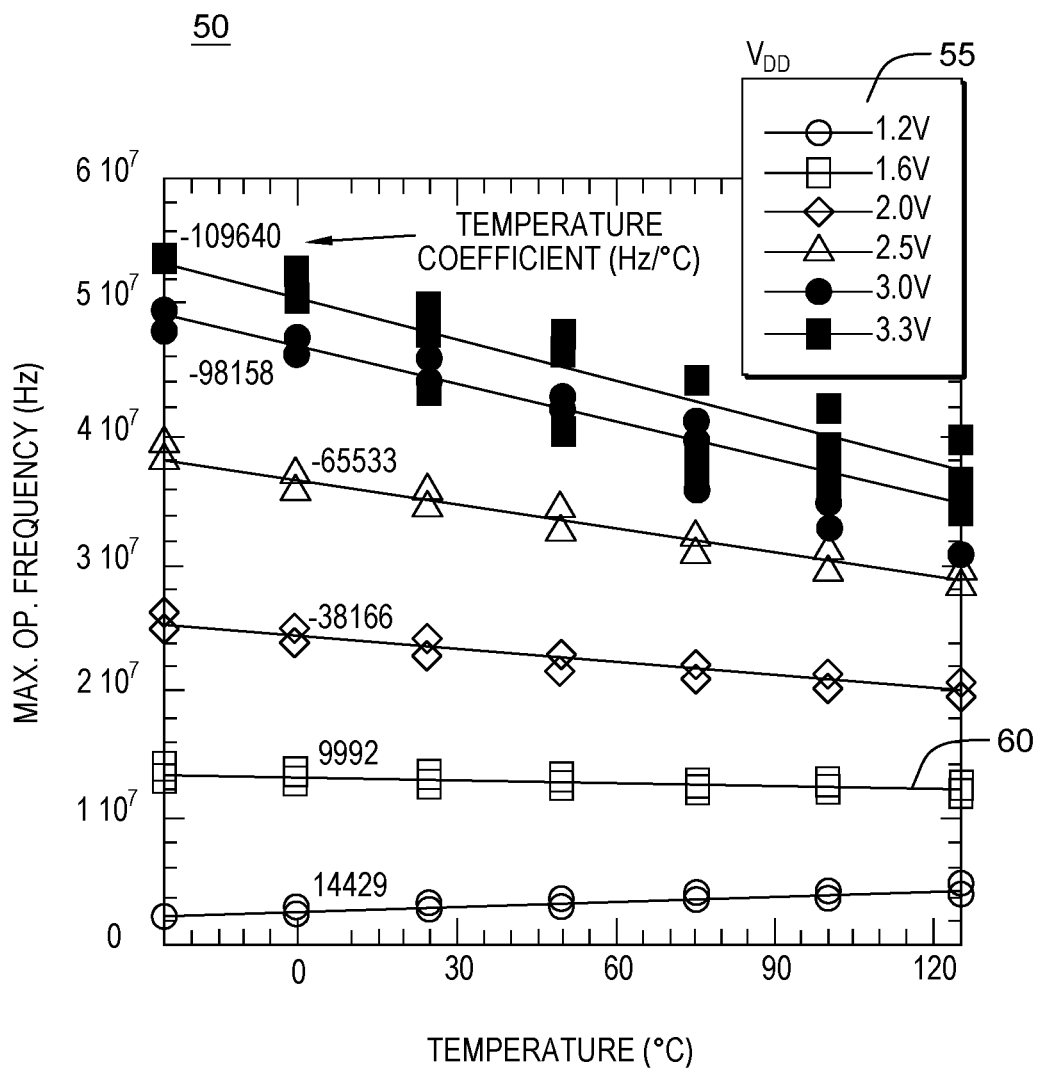
FIG. 6 depicts an example chart depicting a reversal of temperature dependence phenomena in a conventional sensor device.

FIG. 5 illustrates a schematic of an example computer or processing system that may implement the methods for ensuring IoT device functionality in the presence of multiple temperature dependencies in one embodiment of the present disclosure. The computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules 10, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of a computer system may include, but are not limited to, one or more processors or processing units 12, a system memory 16, and a bus 14 that couples various system components including system memory 16 to processor(s) 12. A processor 12 may include the machine learned model that generates the LUT and performs the integrity determination of the functioning IoT device and the device failover functionality as described herein. The module 10 may be programmed into the integrated circuits of the processor 12, or loaded from memory 16, a storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random-access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of operating an Internet-of-Things (IoT) device comprising:
  receiving, at a hardware processor associated with an IoT device, one or more sensed operating conditions obtained from a monitoring circuit associated with said IoT device;
  determining, by said hardware processor, based on said one or more sensed operating conditions, a mode of operation of said IoT device, said mode of operation selected from: a mode indicating IoT device meeting an expected level of performance, or a mode indicating said IoT device is not operating according to the expected level of performance, said determining the mode of operation of said IoT device comprising:
    running, at the hardware processor, a machine learning model trained for determining based on current sensed operating conditions whether the IoT device is operating correctly at an oscillator device speed expected to meet the expected level of performance, the expected level of performance including a performance level based on a temperature-induced variation in a reverse temperature dependence device operating regime; and
    using a look-up table (LUT) having entries, each entry correlating a combination of one or more sensed IoT device operating condition values with a corresponding expectation that the particular sensed conditions in said entry for the IoT device will achieve or will not achieve said expected level of performance; and
automatically adapting an operation of said IoT device according to said determined mode to ensure a desired level of IoT device performance, said automatically adapting comprising:
switching an IoT device mode of operation to either a synchronous or asynchronous mode of operation when a corresponding LUT entry indicates an expectation that the particular sensed operating conditions will or will not achieve said expected level of performance.

2. The method as claimed in claim 1, wherein said sensed operating conditions comprises one or more of: a voltage condition sensed by a voltage sensor of said monitoring circuit and a temperature condition sensed by a temperature sensor of said monitoring circuit.

3. The method as claimed in claim 2, wherein said IoT device comprises an oscillator device providing a clock signal used for IoT device operations, said
machine learning model trained for determining based on a current sensed voltage and or temperature operating conditions whether the IoT device is operating correctly at the oscillator device speed expected to meet the expected level of performance.

4. The method as claimed in claim 3, where said look-up table entries are populated based on a history of IoT device operating conditions for which said expected level of performance was achieved or not.

5. The method as claimed in claim 1, wherein the look-up table entry indicates an IoT device failure based on the temperature-induced variation in a reverse temperature dependence regime, wherein responsive to determining based on operating conditions indicating the IoT device operation in said reverse temperature dependence regime, said adaptively reacting comprising:
switching, by said hardware processor, said IoT device to a failover mode of operation corresponding to system mode of operation at a different operating voltage to ensure device functionality at said expected level of performance.

6. The method as claimed in claim 5, said method further comprising:
for each look-up table entry,
using a counter to record, per look-up table entry, when a detected IoT device operation under expected or unexpected operation conditions is detected to meet the expected level of performance for some duration of time at a specific operating condition, or operation is detected to meet the expected level of performance for some lesser duration of time at a worse operating set of conditions; and
updating said look-up table with the corresponding entry when said unexpected operating conditions indicate conditions meet said expected level of performance based on the recorded count.

7. A system for monitoring an Internet-of-Things (IoT) device comprising:
a hardware processor communicatively coupled to a memory storage device for storing instructions used to configure the hardware processor to:
receive, from one or more sensors of a monitoring circuit associated with an IoT device, one or more sensed operating conditions at said IoT device, said sensed operating conditions comprising one or more of: a voltage condition sensed by a voltage sensor of said monitoring circuit and a temperature condition sensed by a temperature sensor of said monitoring circuit;
determine, based on said one or more sensed operating conditions, a mode of operation of said IoT device, said mode of operation selected from: a mode indicating IoT device meeting an expected level of performance, or a mode indicating said IoT device is not operating according to the expected level of performance, wherein to determine the mode of operation of said IoT device, said hardware processor is further configured to:
run a machine learning model trained for determining based on current sensed operating conditions whether the IoT device is operating correctly at an oscillator device speed expected to meet the expected level of performance, the expected level of performance including a performance level based on a temperature-induced variation in a reverse temperature dependence device operating regime; and
use a look-up table (LUT) having entries, each entry correlating a combination of one or more sensed IoT device operating condition values with a corresponding expectation that the particular sensed conditions in said entry for the IoT device will achieve or will not achieve said expected level of performance; and
automatically adapt an operation of said IoT device according to said determined mode to ensure a desired level of IoT device performance, said automatic adapting comprising:
switching an IoT device mode of operation to either a synchronous or asynchronous mode of operation when a corresponding LUT entry indicates an expectation that the particular sensed operating conditions will or will not achieve said expected level of performance.

8. The system as claimed in claim 7, wherein said IoT device sensor comprises an oscillator device providing a clock signal used for IoT device operations, said machine learning model trained for determining based on a current sensed voltage and or temperature operating conditions whether the IoT device is operating correctly at the oscillator device speed expected to meet the expected level of performance.

9. The system as claimed in claim 8, where said look-up table entries are populated based on a history of IoT device operating conditions for which said expected level of performance was achieved or not.

10. The system as claimed in claim 7, the look-up table entry indicates an IoT device failure based on the temperature-induced variation in a reverse temperature dependence regime, wherein responsive to determining, from said look-up table, an indication of an IoT device operation in said reverse temperature dependence regime based on current sensed operating conditions, said hardware processor is further configured to:
switch said IoT device to a failover mode of operation corresponding to system mode of operation at a different operating voltage to ensure device functionality at said expected level of performance.

11. The system as claimed in claim 10, wherein said hardware processor is further configured to:
prior to updating said look-up table with the corresponding look-up table entry, use a counter to record a count of instances when IoT device functionality is determined as meeting the expected level of performance for some duration of time at a specific combination of operating conditions, or IoT device functionality is determined to meet the expected level of performance for some lesser duration of time at a worse operating set of conditions; and update said look-up table with the corresponding entry indicating said specific combination of operating conditions are conditions meeting said expected level of performance based on the recorded count.

12. A computer program product comprising:

a computer readable storage medium, said medium tangibly embodying a program of instructions executable by a hardware processor, said program of instructions, when executing, configuring the hardware processor to perform a method comprising:

receiving, from one or more sensors of a monitoring circuit associated with an IoT device, one or more sensed operating conditions at said associated IoT device, said sensed operating conditions comprising one or more of: a voltage condition sensed by a voltage sensor of said monitoring circuit and a temperature condition sensed by a temperature sensor of said monitoring circuit;

determining based on said one or more sensed operating conditions, a mode of operation of said IoT device, said mode of operation selected from: a mode indicating IoT device meets an expected level of performance, or a mode indicating said IoT device is not operating according to the expected level of performance, said determining the mode of operation of said IoT device comprising:

running, at the hardware processor, a machine learning model trained for determining based on current sensed operating conditions whether the IoT device is operating correctly at an oscillator device speed expected to meet the expected level of performance, the expected level of performance including a performance level based on a temperature-induced variation in a reverse temperature dependence device operating regime; and using a look-up table (LUT) having entries, each entry correlating a combination of one or more sensed IoT device operating condition values with a corresponding expectation that the particular sensed conditions in said entry for the IoT device will achieve or will not achieve said expected level of performance; and automatically adapting an operation of said IoT device according to said determined mode to ensure a desired level of IoT device performance, said automatically adapting comprising:

switching an IoT device mode of operation to either a synchronous or asynchronous mode of operation when a corresponding LUT entry indicates an expectation that the particular sensed operating conditions will or will not achieve said expected level of performance.

13. The computer program product of claim 12, wherein said IoT device comprises the oscillator device providing a clock signal used for IoT device operations, said machine learning model trained for determining based on a current sensed voltage and or temperature operating conditions whether the IoT device is operating correctly at the oscillator device speed expected to meet the expected level of performance.

14. The computer program product of claim 13, wherein said look-up table entries are populated based on a history of IoT device operating conditions for which said expected level of performance was achieved or not.

15. The computer program product of claim 12, wherein the look-up table entry indicates an IoT device failure based on the temperature-induced variation in a reverse temperature dependence regime, said method further comprising, responsive to determining from said look-up table an indication of an IoT device operation in said reverse temperature dependence regime based on current sensed operating conditions:

switching said IoT device to a failover mode of operation corresponding to system mode of operation at a different operating voltage to ensure device functionality at said desired level of performance.

16. The computer program product as claimed in claim 15, wherein said method further comprises:

prior to updating said look-up table with the corresponding look-up table entry, using a counter to record a count of instances when IoT device functionality is determined as meeting the expected level of performance for some duration of time at a specific combination of operating conditions, or IoT device functionality is determined to meet the expected level of performance for some lesser duration of time at a worse operating set of conditions; and updating said look-up table with the corresponding entry indicating said specific combination of operating conditions are conditions meeting said expected level of performance based on the recorded count.

17. The method as claimed in claim 1, wherein said LUT entries determine the IoT device functionality in the presence of multiple temperature/frequency dependence slopes.

18. The system as claimed in claim 7, wherein said LUT entries determine the IoT device functionality in the presence of multiple temperature/frequency dependence slopes.

19. The computer program product as claimed in claim 12, wherein said LUT entries determine the IoT device functionality in the presence of multiple temperature/frequency dependence slopes.

* * * * *